Jan. 26, 1926.
W. TRINKS
LUBRICATION SYSTEM FOR VALVES
Filed Sept. 22, 1923
1,571,150
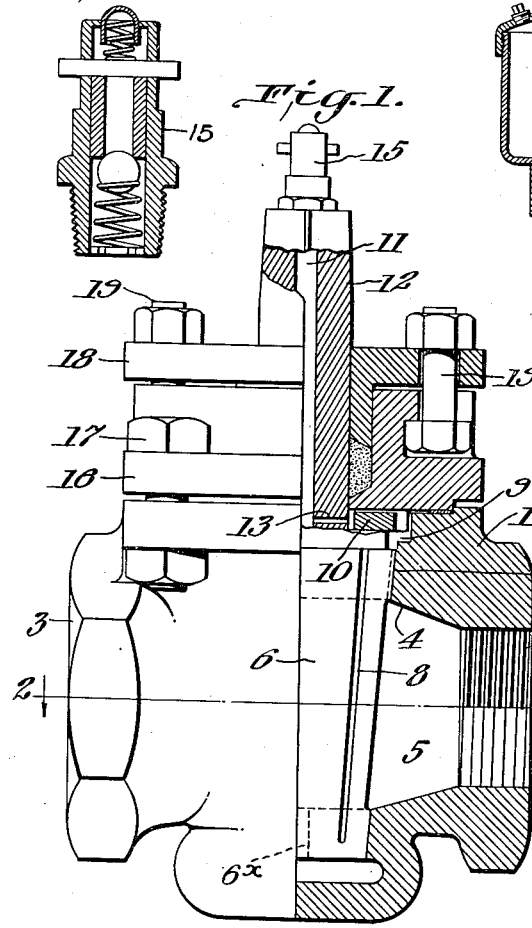
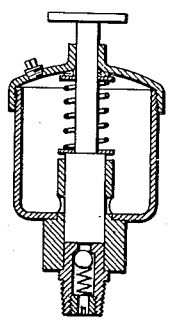
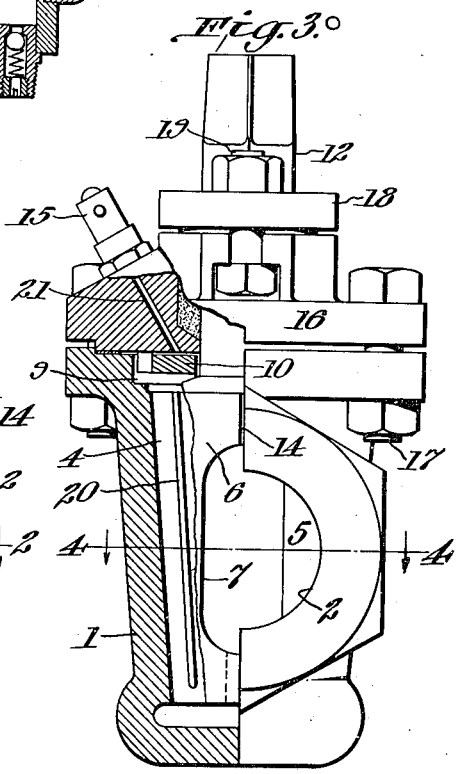
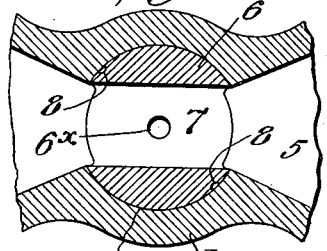
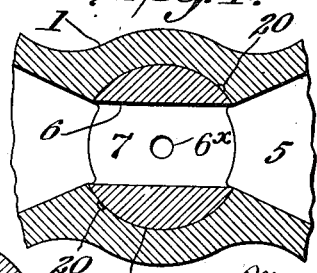
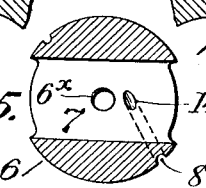
Inventor:
Willibald Trinks
by
Wm. N. Finckel
Attorney.

Patented Jan. 26, 1926.

1,571,150

UNITED STATES PATENT OFFICE.

WILLIBALD TRINKS, OF PITTSBURGH, PENNSYLVANIA, ASSIGNOR TO HOMESTEAD VALVE MANUFACTURING COMPANY, INCORPORATED, OF HOMESTEAD, PENNSYLVANIA, A CORPORATION OF PENNSYLVANIA.

LUBRICATION SYSTEM FOR VALVES.

Application filed September 22, 1923. Serial No. 664,305.

*To all whom it may concern:*

Be it known that I, WILLIBALD TRINKS, a citizen of the United States, residing at Pittsburgh, in the county of Allegheny and State of Pennsylvania, have invented a certain new and useful Improvement in Lubrication Systems for Valves, of which the following is a full, clear, and exact description.

The Homestead Valve Manufacturing Company, of Homestead, Pennsylvania, has for a number of years past been manufacturing, among other things, plug valves of heavy construction to resist severe strains in use. Valves of this character oftentimes require to be opened and closed frequently, and owing to the pressures they have to sustain and the nature of the service required and other exigencies, the plugs have a tendency to turn hard and oftentimes stick in their seats.

The valve illustrated in the accompanying drawings is a typical Homestead valve manufactured by the corporation above mentioned, and in substantial accordance with the Patent No. 560,993, dated May 26, 1896, and others, in which cam surfaces are interposed between the top of the plug and the adjacent cap, one of the cam surfaces being stationary so far as rotation is concerned and designed to aid in the facility of turning the plug and to hold it in its seat and to lock it in either opened or closed position.

Notwithstanding these precautions and provisions for insuring a fluid-tight and easy working valve, it is found that in some classes of service the plug is apt to become jammed in its seat and otherwise work so hard as to be troublesome.

To overcome these difficulties, it has been proposed to lubricate the valve but so far as my observation goes the attempts have not been altogether satisfactory.

The object of this present invention is to provide a lubricating system for valves of the character described, which will be effective in operation, conserve the lubricant, and prevent the lubricant from being commingled to any appreciable extent with the working fluid or the fluid controlled by the valve.

The invention consists of a lubrication system for valves in which the valve body or the plug is provided with longitudinal channels to insure a thorough lubrication of the plug seat and the plug without the possibility of accumulating an excess quantity of lubricant in any portion of the valve body; special provision being made for thoroughly lubricating the chamber containing the cooperative cam elements of the Homestead Valve Manufacturing Company's valve, this chamber having a relief-port by which any excess of pressure in the chamber may find egress and thereby prevent the sticking or jamming of the plug in its seat, as I will proceed now to explain and finally claim.

In the accompanying drawings illustrating the invention, in the several figures of which like parts are similarly designated, Figure 1 is a half section and side elevation illustrating one form of the valve, in which the lubricating channels are in the plug. Fig. 2 is a horizontal section through the plug and adjacent parts of the body, taken on line 2—2 of Fig. 1. Fig. 3 is a half section and end elevation illustrating another form of valve, in which the lubricating channels are in the body. Fig. 4 is a horizontal section through the plug and adjacent parts of the body, taken on the line 4—4 of Fig. 3. Fig. 5 is a cross section of a channelled plug having the relief port leading from a channel into the fluid-way or port. Fig. 6 is a longitudinal section, on a larger scale, of a fitting or connection, (see, for example, Patent No. 1,316,714) for use with the well-known "Alemite" compressor. Fig. 7 is a longitudinal section of the well-known Madison-Kipp lubricator, (see, for example, Patent No. 1,262,981), but which may replace or be substituted for the Alemite It is to be understood at the outset that the invention is not limited to any particular form, construction, or style of valve, although as already stated, it is particularly efficient in heavy plug valves. Without therefore limiting the invention, I will proceed to described the same in connection with two forms of such valves.

1 is a body having the screwthreaded pipe connections 2 and 3, or any number of them and in any arrangement, and the plug seat 4 divided only by the fluid-way or port 5 and otherwise continuous and forming the herein mentioned tapered seat for the plug. 6 is a tapered plug fitted to turn in said seat and having the port, way or passage 7. For purposes of lubrication, the plug is made with diagonally opposite channels 8 which extend from the top of the plug to near its bottom but not to the bottom, so that the lubricant will not escape from the channels and accumulate in the body, but will always be supplied by said channels to the valve seat in film form, in an efficient and economical manner. The stopping off of the channels prevents formation of lubricant under pressure below the plug, and as a further safeguard I may provide the opening 6× in the bottom of the plug, leading into the port 7. Pressure under the plug would tend to raise the plug from its seat and allow the lubricant to be washed away by the working fluid passing between the plug and its seat.

In some plug valves there is a space of varying dimensions between the top of the plug and the closing cap of the body. In the illustrations in the drawings this space or chamber 9 is utilized to receive the hereinbefore referred to cam elements of the Homestead valve, one of these elements being a cam ring 10 made and arranged substantially in accordance with the patent above referred to. This chamber is utilized in the present invention as a sort of distributing reservoir for the lubricant, which, in the instance shown in Fig. 1, is supplied through a central duct 11 in the stem 12, the exit from this duct being the transverse hole 13 opening into the chamber.

To prevent the formation of excess pressure in the chamber, a relief-port, groove or channel 14 is preferably provided to insure an escape of the excess pressure into the working fluid passage, and to equalize the pressure.

The lubricant may be supplied through a grease gun or pressure cup or other device capable of supplying lubricant against pressure. As shown in Figs. 1, 3 and 6, I may employ the well-known "Alemite" lubricator system, which includes a compressor or grease gun and the fitting 15 having the two spring check valves, and either screwed into the stem 12 or the cap 16, and adapted to receive and be engaged by the bayonet-slotted end of the compressor. Or I may use at either place or elsewhere the equally well-known Madison-Kipp lubricator shown in Fig. 7. The invention, however, is not limited to the kind of lubricant introducing device, but it is preferred to employ one using pressure to force in the lubricant, and the connection piece of which has one or more check valves to prevent back pressure.

The cap is shown as held to the body by means of flanges on the cap and body and screw bolts 17 engaging said flanges, and the stem is packed in this cap and the packing secured by the gland 18 which is connected to the cap by means of screw bolts 19, although of course these details are variable at pleasure.

In the construction shown in Figs. 3 and 4 the longitudinal lubricant channels 20 are shown as made in the body of the valve instead of in the plug, and the lubricant is supplied through a channel 21 in the cap 16.

As shown in Fig. 5 the relief-port 14× may extend from one of the channels 8 to the fluid-way 7 in the plug. And it may be located elsewhere so long as it serves to relieve the cam chamber, or chamber at the top of the plug, of excess pressure which would tend to cause the jamming or sticking of the plug in its seat. Wherever located, its purpose is to prevent the building up of permanent pressure of the lubricant in excess of the pressure of the controlled fluid. It prevents the action of confining the lubricant under pressure between the plug and its seat.

The relation between the size of the inlet opening 13, the size and length of the channels 8 or 20, and the size of the relief-port 14, must be such as to insure lubrication and prevent temporary binding of the plug. The relief port 14 is merely a shallow and narrow groove, sufficient to afford pressure relief but not large enough to permit waste of lubricant. No attempt is made in the drawings to show mathematically these proportions, especially as they may vary to suit conditions, such as the size of valve and kind of lubricant used.

As shown in Figs. 2 and 4, the channels 8 and 20 are so arranged that in the turning of the plug they will never be uncovered.

By the construction described it is possible to efficiently lubricate the contact parts of the plug and the body and to prevent jamming or sticking of the plug in its seat, because the camming members are continually bathed in clean lubricant, and as a consequence corrosive action of the controlled fluid is kept away from the camming surfaces, thus preventing rust or incrustation which cause the valve to work hard.

As will be seen, the lubricant in the chamber 9 has access to the packing above it which is confined by the packing gland as already described.

The valve illustrated in the accompanying drawings is, as previously stated, a typical Homestead valve, but as will be seen by the foregoing, the drawings also include the lubrication system of this invention.

Variations in the details of construction and arrangement are permissible within the principle of the invention and the scope of the claims following.

What I claim is:—

1. In a lubrication system for valves, a valve body having a tapered seat, a rotary plug mounted in said seat, the top of the plug and adjacent parts of the body forming a chamber, and a lubricant inlet to said chamber provided with a check valve, the said chamber opening into channels extending therefrom to a point short of the smaller end of the plug and in contact with said seat, and a pressure relief-port connected with said chamber and opening within the valve body.

2. A plug valve, comprising a valve body provided with a tapered seat and a turning plug mounted in said seat, the larger end of the plug and adjacent portions of the body forming a chamber, a lubricant inlet into said chamber, a check valve applied to the adit to said inlet and operating to prevent discharge of the lubricant to the atmosphere, lubricant distributing channels leading from said chamber to various parts of the valve seat and stopped off from the escape of lubricant into the body beyond the plug seat, and a port open at both ends wholly within the valve body for relieving the chamber of excess pressure.

3. In a plug valve, a valve body provided with a tapered plug seat, a tapered plug mounted in said seat and adapted for rotation therein to open and close the valve, there being a chamber interposed between the larger end of the plug and adjacent parts of the body, means in said chamber to ease the movement of the plug and to lock it in given position, a lubricant inlet into said chamber to supply lubricant to said chamber and keep its contained parts bathed in lubricant, and channels extending from said chamber along the seat and stopped off from communication with the lower part of the body of the valve.

4. In a plug valve, a valve body provided with a tapered plug seat, a tapered plug mounted in said seat and adapted for rotation therein to open and close the valve and having a packed stem, there being a chamber interposed between the larger end of the plug and adjacent parts of the body, means in said chamber to ease the movement of the plug and to lock it in given position, a lubricant inlet into said chamber to supply lubricant to said chamber and keep its contained parts bathed in lubricant and to supply lubricant to the stem packing, channels extending from said chamber and in open communication with the seat and stopped off from communication with the lower part of the valve body, and a pressure relief-port communicating with said chamber.

5. In a plug valve, a valve body provided with a tapered plug seat, a tapered plug mounted in said seat and adapted for rotation therein to open and close the valve, said plug having a packed stem, the body and the plug at one end of the plug being spaced apart by a chamber containing means to ease the movement of the plug and to lock it in given position, means by which lubricant under pressure may be introduced into said chamber to keep its contained parts bathed in lubricant, means to distribute the lubricant from said chamber to the plug and its seat, and a pressure relief-port communicating with said chamber and serving also as a pressure equalizing means.

In testimony whereof I have hereunto set my hand this 15th day of September A. D. 1923.

WILLIBALD TRINKS.